Patented May 11, 1943

2,318,968

UNITED STATES PATENT OFFICE 2,318,968

ACRIDINIUM AZO COMPOUNDS

Frederick Proescher, San Jose, and Vladimir M. Sycheff, Palo Alto, Calif., assignors to Research Corporation, New York, N. Y., a corporation of New York No Drawing. Application May 6, 1941, Serial No. 392,176

4 Claims. (Cl. 260—155)

This invention relates to azo compounds having chemotherapeutic properties.

An object of this invention is to provide azo compounds which display bactericidal action.

The products of this invention comprise a radical selected from the group consisting of the sulfanilamide radical and radicals of its $N^1$-substituted derivatives (according to Northey, Chem. Rev. 27, No. 1, 85 et seq., 1940) linked by an azo group to an aminoacridinium radical. Characteristic of the first-mentioned group are radicals of compounds such as sulfanilamide and sulfapyridine, the radical being that remaining after removal of the amino group from the molecule. Exemplary of the aminoacridinium radicals are radicals of compounds such as 2-ethoxy-6.9-diaminoacridinium, 3.6-diaminoacridinium, 3.6-diamino-10-methyl acridinium chloride and 3.6-diaminoacridinium sulfate, such radicals being those remaining after removal of a hydrogen from the acridinium ring. Usually, the azo group is linked to the acridinium ring in position 8.

In a process of making the compounds of this invention sulfanilamide, or one of its $N^1$-substituted derivatives, is diazotized in a manner well known to the art. The diazo compound resulting is coupled with a coupling component comprising an aminoacridinium, preferably a diaminoacridinium, in the usual way to form the azo compounds of the invention.

The general structural formula of the compounds is as follows:

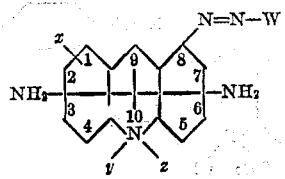

in which W is a radical of sulfanilamide or its $N^1$-substituted derivatives, the N directly linked to said radical as shown above being the $N^4$-nitrogen of the "sulfa" compound, $x$ is hydrogen or alkoxy linked to any one of the carbon atoms of the aminoacridinium, $y$ is hydrogen or a lower alkyl, and $z$ is hydrogen or a monobasic acid radical. The amino groups shown in the structural formula are linked each to a separate carbon atom of the acridinium ring.

The following specific examples show several compounds of the invention and methods of preparing them, it being understood that the examples are merely illustrative of the invention.

Example 1

12.3 g. of sulfanilamide suspended in 50–70 cc. of water is diazotized with 6.5 g. of potassium nitrite dissolved in 20–25 cc. of water using 6.5 g. of hydrochloric acid (about 60 cc. of a 10% solution) to maintain the reaction medium acid. Prior to diazotization, the several solutions are cooled to a temperature of about 3–5° C., and the reacting solutions are maintained at about this temperature during the diazotization which is carried out by adding small portions of the potassium nitrite solution to the suspension of sulfanilamide while constantly stirring the reacting mass. The reaction is carried out on the acid side, acidity being maintained by appropriate additions of the hydrochloric acid solution. The mass should be stirred constantly until it attains a lemon-yellow color.

25 g. of 2-ethoxy-6.9-diaminoacridinium is suspended in water and acidified with a small amount of 3%, cooled, hydrochloric acid. To effect coupling with the sulfanilamide, this suspension is rapidly mixed, by vigorous stirring, with the resuspended diazo compound of the sulfanilamide, together with a small amount of water, for at least twenty minutes at a temperature of 3–5° C., until the mass assumes an orange color. It is then quickly filtered, washed with half-saturated sodium chloride solution, and dehydrated on a porous porcelain plate. The total yield is about 85–90% of the theoretical.

The reaction may be illustrated by the following equation:

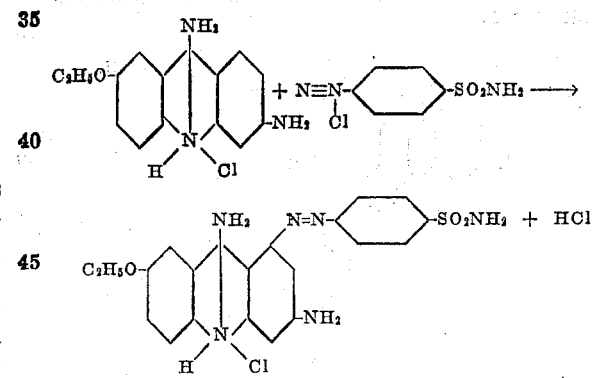

The azo compound so produced has no definite melting point, and decomposition starts at approximately 250° C. Solubility in water is about 0.7%. Solubility in propylene glycol is about 1%. The compound may be crystallized from a solution of methyl ether of ethylene glycol to yield large rhomboidal crystals.

*Example 2*

20.5 g. of 2-sulfanilamidopyridine in 50 cc. of 15% aqueous hydrochloric acid is diazotized with 5.6 g. of sodium nitrate, and coupled with 28 g. of 2-ethoxy-6.9-diamino-acridinium suspended in water by a process similar to that described in Example 1. The following compound results:

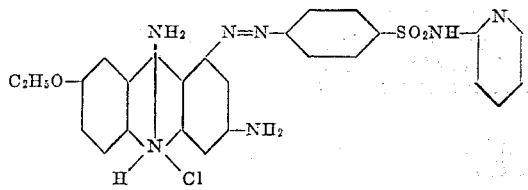

This azo compound has an intense yellow color and is slightly astringent. It has no true melting point, but melts at about 250° C. with decomposition. It is slightly soluble in water (0.3%) forming viscous solutions. It is readily soluble in alcohol, acetone and propylene glycol.

*Example 3*

Sulfanilamide is similarly coupled with 3.6-diamino-10-methyl acridinium chloride to produce an azo compound of the following formula:

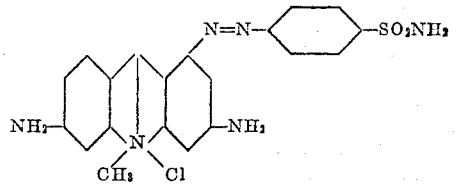

*Example 4*

In a similar way 3.6-diaminoacridinium sulfate is coupled with sulfanilamide yielding a compound with the following structural formula:

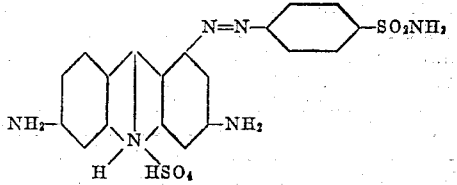

*Example 5*

Also 3.6-diaminoacridinium yields with sulfanilamide a compound having the following structure:

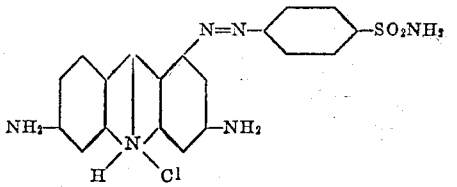

The number of compounds which fall within the purview of this invention is large, the examples given above being by way of illustration only. Therefore, the scope of the invention is to be limited only by the following claims.

We claim:

1. Azo compounds of the following general formula:

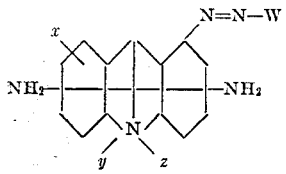

in which W is a radical selected from the group consisting of the sulfanilamide radical and the sulfapyridine radical, $x$ is a radical selected from the group consisting of hydrogen and alkoxy radicals and is linked to one of the carbon atoms of the acridinium ring, $y$ is a radical selected from the group consisting of hydrogen and alkyl radicals, $z$ is a radical selected from the group consisting of hydrogen and monobasic acid radicals, and the amino groups are linked each to a carbon atom of the acridinium ring.

2. An azo compound of the following formula:

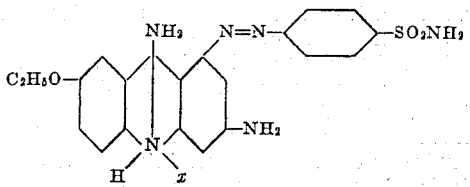

in which $x$ is a radical selected from the group consisting of hydrogen and monobasic acid radicals.

3. An azo compound of the following formula:

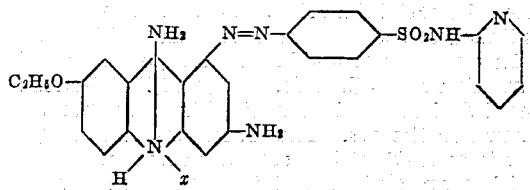

in which $x$ is a radical selected from the group consisting of hydrogen and monobasic acid radicals.

4. An azo compound of the following formula:

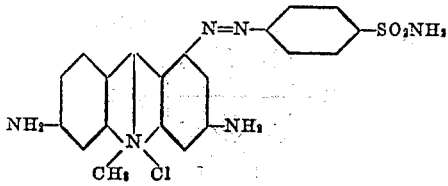

FREDERICK PROESCHER.
VLADIMIR M. SYCHEFF.